July 3, 1951  F. A. WOOL  2,559,101
FROZEN FOOD PACKAGE
Filed Aug. 13, 1945  3 Sheets—Sheet 3
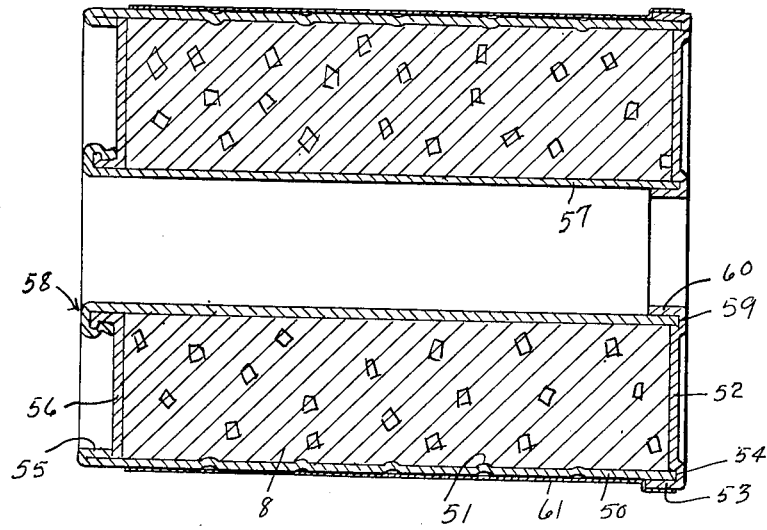
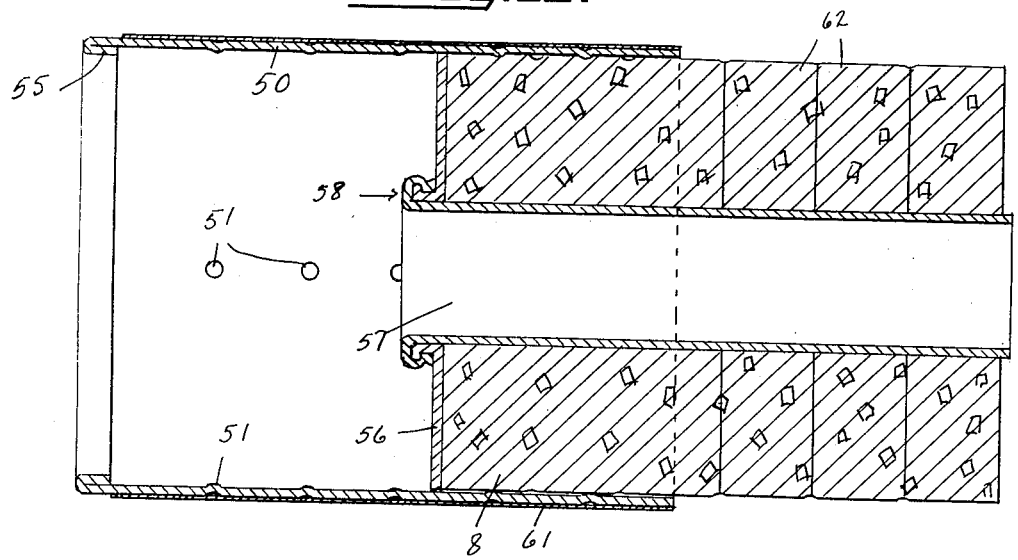
INVENTOR.
FRANK A. WOOL
BY
Boyken, Mohler & Buckley
ATTORNEYS.

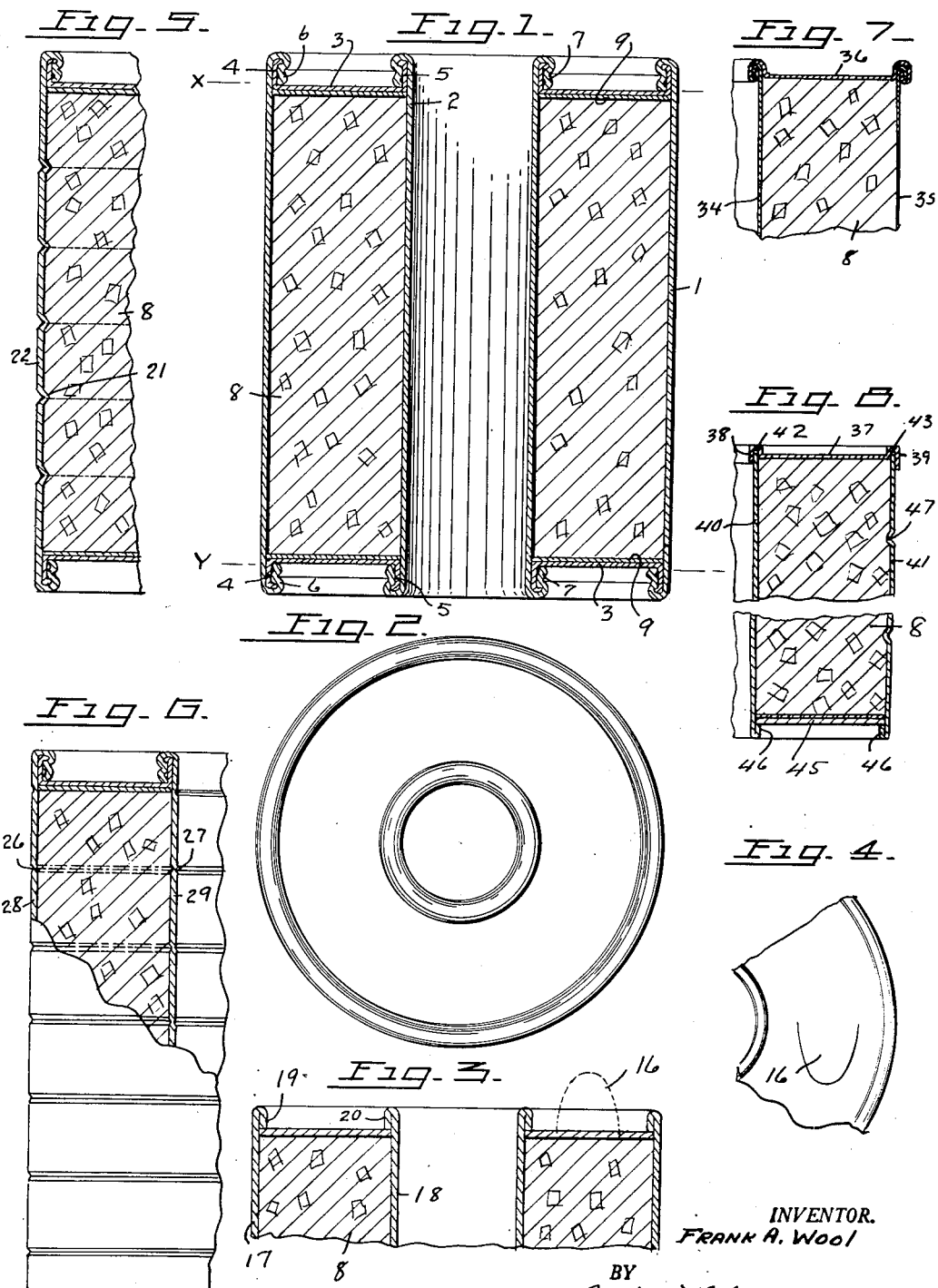

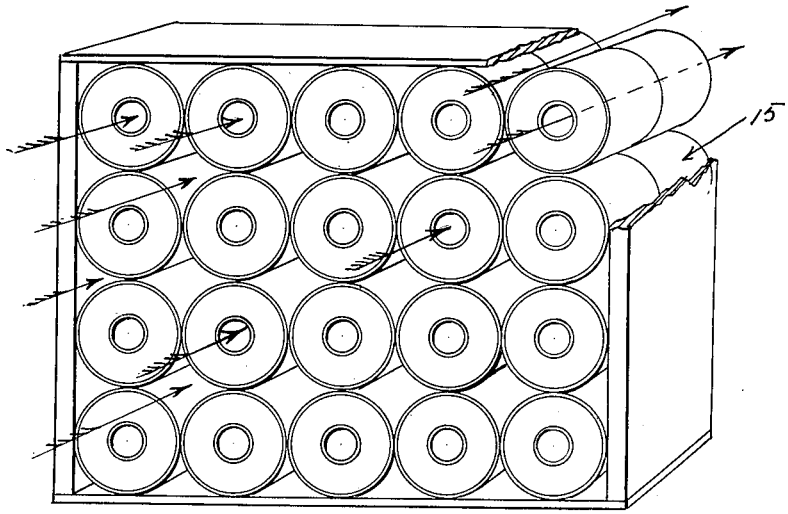
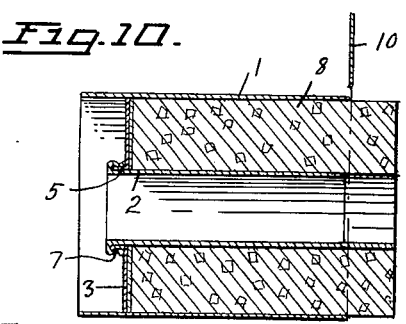
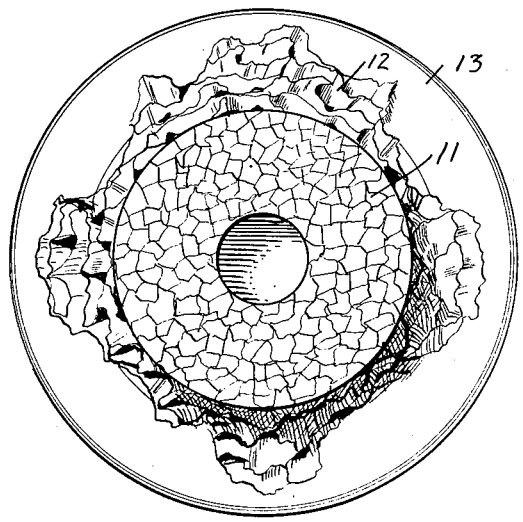
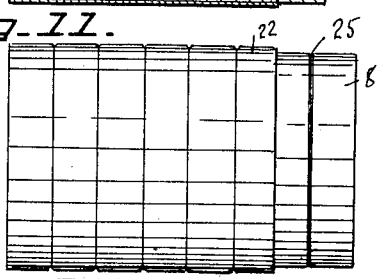
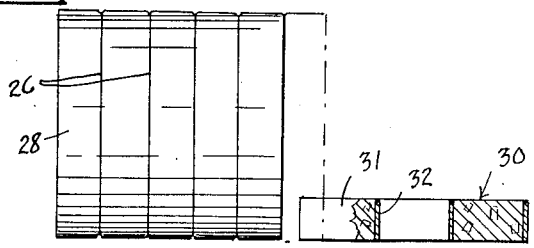
INVENTOR.
FRANK A. WOOL

Patented July 3, 1951

2,559,101

UNITED STATES PATENT OFFICE 2,559,101

FROZEN FOOD PACKAGE

Frank A. Wool, San Jose, Calif.

Application August 13, 1945, Serial No. 610,519

6 Claims. (Cl. 99—171)

This invention relates to a frozen food package and to a method of freezing food.

One of the objects of the invention is the provision of an improved frozen food package that enables a more efficient and better freezing of food and of subsequently serving the same than heretofore.

Another object of the invention is the provision of a method that enables the freezing of foods in relatively large sized bodies free from objections heretofore encountered in their freezing.

A still further object of the invention is the provision of an improved frozen food package of food such as diced fruit and which fruit is formed into a body that may be cut into slices and that will be supported during slicing free from breakage of the slices.

Other objects and advantages will appear in the description and in the drawings.

Special mention is made of the fact that the present food package and method is particularly suited to what is known as diced fruit or cocktail fruit in which various kinds of fruit, such as pears and peaches, may be cut into cubes and mixed with seedless grapes and maraschino cherries to form a colorful fruit salad. The fruits used may, of course, vary as desired.

At the present time the diced fruit is first cooked and sealed in cans and various ways have been employed in serving it, but in each instance the fruit pieces separate and are difficult to arrange except in a scattered form or in piles or in cups, unless the user sets them in gelatine or the like. Furthermore inasmuch as the cubes or dice are relatively small, they are difficult to cook in the canning operation without injury. Attempts to quick freeze the fruit have encountered the difficulty of properly freezing to the center of the can or container inasmuch as the fruit is very wet and is in a syrup and upon removal from the can the fruit is even more difficult to handle than in the case of the conventionally cooked canned fruit.

By the present invention the food, whether diced fruit or other food, is easy to quickly freeze in the proper manner and is adapted to be sliced when removed from the container without breakage, the resultant slices resembling in shape whole pineapple slices, thus making it easy for the housewife to arrange the food in many pleasing ways and in many combinations.

In the drawings, Fig. 1 is a vertical sectional view taken through a package.

Fig. 2 is a top plan view of the package of Fig. 1.

Fig. 3 is a fragmentary sectional view showing a slightly different form of crimping at the end of the package than is shown in Fig. 1.

Fig. 4 is a fragmentary plan view of a portion of the package of Fig. 3 showing one of the tabs for removing the top.

Fig. 5 is a fragmentary sectional view through the outer wall of a modified form of container in which said wall is formed with means for marking the contents.

Fig. 6 is a fragmentary part sectional, part elevational view of a package in which the inner and outer walls are severable along lines and which walls also mark the contents but in a form that is the reverse of that of Fig. 5.

Fig. 7 is a fragmentary sectional view of a package showing the conventional crimping for either or both ends of the containe of the package, which crimping is different from that of the other forms but is one of the t pes employed for tin cans.

Fig. 8 is a fragmentary sectional view showing a different top and bottom closure in a package that has marking means similar to that of Fig. 5.

Fig. 9 is a semi-diagrammatic perspective view of several tiers of cans arranged in a preferable manner relative to the cold air flow for quickly freezing the contents.

Fig. 10 is a reduced size sectional view through a package, such as that of Fig. 1, but which package has been altered for dispensing the contents, said contents being indicated as partly removed for slicing by a knife blade, the latter being indicated in section.

Fig. 11 is an elevational semi-diagrammatic view (reduced size) showing the contents partly removed from a can of the type shown in Figs. 5, 8 preparatory for cutting into slices.

Fig. 12 is a part sectional, part elevational view of a package such as shown in Fig. 6 in which a slice has been removed, the slice being partly in section.

Fig. 13 is a plan view of a slice of the contents of any one of the containers on a plate and on any desired bed, such as lettuce leaves.

Fig. 14 is an enlarged sectional view taken through a package of slightly different form from the others illustrated herein.

Fig. 15 is an enlarged sectional view taken through a package of the type indicated in Fig. 14 showing the body of frozen food partly removed from the container with the projecting portion sliced on the central support while the remainder of the body is enclosed in the outer shell or support.

In detail the package illustrated in Figs. 1, 2 comprises a container having an outer tubular wall 1 and an inner tubular wall 2 spaced inwardly of the outer wall and concentric with the latter. Both the inner and outer wall are preferably cylindrical and may be of any desired length according to the volume of food to be positioned within the container. The container may have identical annular heads 3.

While the container of Figs. 1, 2 may be of any desired material, it is preferably of cardboard that may be paraffined or waxed or treated with any desirable waterproofing material and the heads 3 may be formed with outer and inner annular flanges 4, 5 that project axially relative to the axis of the container and that respectively lie against the marginal portions of opposite ends of the walls 1, 2. The flanges 4, 5 project oppositely outwardly relative to the center of the container and the walls 1, 2 may extend over the free edges of the flanges and then back toward the center of the package, the extensions being indicated at 6, 7 are crimped with the flanges 4, 5 to insure securement of the heads over opposite ends of the contents 8 of the package.

The contents 8 is diagrammatically shown to indicate cubed or diced fruit, it being understood that the pack of fruit dices may be practically solid and not in scattered pieces, although syrup is added to the pack when in the container.

If desired, the heads 3 may have liner disks 9 on their inner sides although these are not found to be absolutely necessary particularly where the material of the heads is properly treated.

Inasmuch as the contents 8 of the package is frozen into a single tubular body around the inner cylinder 2, the same may be readily removed from within the outer cylinder by merely dipping the package in hot water for a moment and by then cutting through the end marginal portions of outer wall 1 along lines x. This will free the body for sliding out of one end of the outer body whereupon one head 3 may easily be removed from the inner tubular member, either by cutting through the end marginal portion of said inner member or in any other desired manner.

As seen in Fig. 10 the outer tubular member 1 may readily be held in one hand and the body 8 pushed out of one end of said member 1 by merely pushing on the head 3 that still remains on the inner tube 2. The projecting end of the body may then be sliced by knife 10 while the said projecting end is supported on the tubular member 2. The support offered by said inner tube is quite important at this stage to prevent crumbling or collapse of the body due to the pressure of the knife. The resultant slices 11 (Fig. 13) are readily slipped off the inner tube 2 into the desired position, such as on a bed of lettuce 12 on a plate 13 preparatory to further garnishing or the placing of a filling in the central opening of the slice. Thus it will be seen that the food, such as diced fruit, may be easily handled and positioned in a decorative manner and in a form that lends itself to further useful and decorative arrangements which heretofore have been impossible.

Attempts to freeze solid cans of fruit and the like are not successful due to the difficulty in properly freezing to the center of the pack. However, the provision of the central open ended tubular member enables a quick and perfect freezing to take place.

Fig. 9 clearly illustrates one method of freezing in which the packages generally designated 15 may be arranged in tiers with their central bores in alignment. The air at sub-zero temperature is free to flow through the central bores and over the outer sides of the packages.

In Figs. 3, 4 is shown a quick removable head provided with one or more tabs 16 for removal from the outer and inner cylinders 17, 18, the latter being merely turned over at their end marginal portions as indicated at 19, 20 to function as stops for preventing outward movement of the heads. The packages may be dipped in paraffine or the like before freezing, if desired, but inasmuch as the body of food 8 is preserved by freezing, it is not necessary to hermetically seal the package.

In most instances the body 8 of frozen food is sliced and the housewife ordinarily experiences considerable difficulty in cutting the slices uniformly. In Fig. 5 is shown a fragment of a package that is identical with the package of Fig. 1 in every respect except that similar equally spaced radially inwardly projecting ridges 21 are formed in the outer cylindrical member 22. These ridges offer no material obstruction to removal of the body 8 from the outer cylinder due to the momentary dipping of the package in hot water that melts the film of the contents that lies next to the member 22. However, as seen in Fig. 11, the body 8 will be marked with markings 25 to indicate lines where the slices may be cut, if desired. Should thicker slices be desired, it is relatively easy to procure uniformity by judging distances from the markings which would not be possible in the absence of the latter.

Fig. 6 indicates a structure that may be employed to produce markings similar to those in the package of Fig. 5. In this instance, however, the lines indicating uniform slices constitute lines of weakness 26, 27 in the outer and inner tubular walls 28, 29 respectively of the package through which a knife may readily cut to provide slices 30 (Fig. 12) that are held in annular rings 31, 32 cut from the walls 28, 29 which rings may be lifted from the annular disks of frozen food that is between them.

While the previously described packages show containers that are of fibrous material, such as cardboard, it is obvious that metal may be used. Fig. 7 shows metal inner and outer walls 34, 35 that are crimped to head 36 by the conventional crimping used for tin cans. Any conventional can opener may be used to cut the heads free.

Fig. 8 shows a form of package in which one head 37 is provided with flanges 38, 39 that merely overlie the marginal portions of the inner tubular member 40 and the outer member 41. This head is formed with annular recesses 42, 43 at the juncture between the flanges and head that receive the free end edges of the inner and outer members 40, 41 thus holding them properly spaced from each other. This head 37 may be removed by hand.

The opposite head 45 may be merely held against outward movement relative to body 8 by inturned marginal portions 46 on the outer and inner tubular members and outer walls 41 may have indentations 47 formed therein to mark the external surface of the body 8 for the same purpose as the ridges 21 of Fig. 5.

Fig. 14 illustrates a package in which the outer cylindrical wall 50 has one or more rows of slight projections 51 on its inner side. These projections may be mere indentations formed in the outer side to effect raised points on the inner surface, and they are equally spaced apart in direction axially of the outer wall.

The head 52 is the top wall and has an outer flange 53 projecting over the marginal portion at the end of wall 50 adjacent thereto while an annular recess 54 may be in the head adjacent the flange, if desired, for receiving the end edge of wall 50.

The end of the wall 50 opposite the head 52 is merely turned inwardly as at 55 to form a stop for the head 56 that is the bottom of the package. The outer periphery of head 56 slidably fits the inside of the cylindrical outer wall 50.

The inner cylindrical wall 57 is secured at the bottom end of the package to head 56 by crimping the same to said head 56 as indicated generally at 58.

The opposite end of the inner cylinder 57 extends into annular recess 59 in head 52 which recess is adjacent flange 60 that extends over the inner side of the cylinder 57 at the end that is in said recess.

The head 52 may be removably secured to the package by a label or relatively thin wrapper 61 or by any such sheet that extends over the flange 53 and across the edge of the latter to the outer cylinder 50. This may be easily and quickly cut or broken along the edge of the flange 53 to release the head 52.

It will be seen that merely by removing the head 53 which can be readily done by hand (first preferably allowing hot water to run over the package for a moment or dipping it in hot water) the frozen body 8 supported on innei cylinder 57 may be pushed out of the open top as indicated in Fig. 15 for slicing the body into slices 62.

The exterior surface of the body 8 will be marked by the projections 51 but the operator will readily feel the resistance to passage of the edges of head 56 over them as they are reached. As each projection is reached, the operator may merely run a knife around the body at the edge of the top end of the outer wall and uniform slices will be produced. These slices readily slip off the inner cylinder in the place desired without the necessity of handling them manually.

In the absence of the inner cylinder in all of the different types of containers, the desired freezing of the food material is not accomplished nor could the body, when frozen, be readily sliced without danger of breakage, nor would the central aperture be provided in the slices cut from the body for a filling. Furthermore inasmuch as the bottom end of the package may be sliced through the container there is no problem or difficulty from the normal tendency of material to be held in the container by suction.

I claim:

1. A frozen food package comprising a tubular open-ended body of frozen food, a tubular outer member surrounding said body and against which the outer surface of said body is supported, a tubular open-ended inner member concentric with said body and outer member extending centrally through said body and supporting the same thereon, coaxial centrally apertured heads at opposite ends of said body extending between the corresponding end edges of said outer and inner members and respectively secured to said members, one of said heads being slidably supported within said outer member for movement axially of the latter through the same to the opposite end of said body when the other head at said opposite end is removed.

2. A frozen food package comprising a cylindrical open-ended body of frozen food, a cylindrical outer member surrounding said body and against which the outer surface of said body is supported, said body being provided with projection on its outer surface equally spaced in direction axially of said body for defining equal sections of said body upon removal of said body from said outer member, a cylindrical open-ended inner member concentric with said body and outer member extending centrally through said body for supporting the same thereon upon removal of said body from said outer member, annular heads connecting between the corresponding ends of said inner and outer members and extending across the ends of said body, flanges on said outer and inner members for releasably securing one of said heads to said outer and inner members and the opposite head being slidably supported within said outer member for movement axially of the latter toward the end opposite thereto, and said body being slidable on said outer member out of the end of said outer member from which said one head is adapted to be released.

3. A frozen food package comprising a pair of concentric hollow cylinders spaced apart, the inner cylinder of said pair being open-ended, a cylindrical body of frozen food on said inner cylinder filling the space between it and the outer cylinder of the pair, annular heads extending across the ends of said body supporting said cylinders in concentric relationship, one of said heads being formed with axially projecting annular flanges around its inner and outer edges disposed in engaging relation to the marginal portions of the ends of said cylinders at one end of said body and flanges at the opposite end of said body securing the head at said opposite end against outward movement relative to said body, said body being formed with a row of equally spaced surface markings on its outer surface, said row extending in direction of the axis of said body.

4. A frozen food package comprising a pair of concentric hollow cylinders spaced apart, the inner cylinder of said pair being open-ended, a cylindrical body of frozen food on said inner cylinder filling the space between it and the outer cylinder of the pair, annular heads extending across the ends of said body supporting said cylinders in concentric relationship, one of said heads being formed with axially projecting annular flanges around its inner and outer edges disposed in engaging relation to the marginal portions of the ends of said cylinders at one end of said body and flanges at the opposite end of said body securing the head at said opposite end against outward movement relative to said body, said body being formed with a row of equally spaced markings on its outer surface indicating lines of severance for cutting said body into equal segments, and said outer cylinder being formed with correspondingly positioned lines of weakness to facilitate cutting through said cylinder to so sever said body.

5. A frozen food package comprising a pair of concentric hollow cylinders spaced apart, the inner cylinder of said pair being open-ended, a cylindrical body of frozen food on said inner cylinder filling the space between it and the outer cylinder of the pair, annular heads extending across the ends of said body supporting said cylinders in concentric relationship, one of said heads being formed with axially projecting annular flanges around its inner and outer edges disposed in engaging relation to the marginal portions of the ends of said cylinders at one end of said body and flanges at the opposite end of said body securing the head at said opposite end against outward movement relative to said body, said body being formed with a row of equally spaced markings on its outer surface indicating lines of severance for cutting said body into equal segments, and said outer cylinder being formed with correspondingly positioned lines of weakness to facilitate cutting through said cylinder to so sever said body, said inner cylinder being formed with lines of weakness correspondingly in position with those on said outer cylinder to facilitate cutting through the said inner cylinder as well as the outer one.

6. A frozen food package comprising a tubular open-ended body of frozen food, a tubular outer member surrounding said body and against which the outer surface of said body is supported, a tubular open-ended inner member concentric with said body and outer member extending centrally through said body and supporting the same thereon, coaxial centrally apertured heads at opposite ends of said body extending between the corresponding end edges of said outer and inner members and respectively secured to said members, one of said heads being secured to the end of said inner member adjacent thereto for movement with the latter out of the opposite end of said outer member when the other head at said opposite end is disconnected from said outer member, and flanges on the other one of said heads and the opposite end of said outer member for releasably securing said other head to said opposite end of said outer member whereby said body will be supported on said inner member during said movement.

FRANK A. WOOL.

REFERENCES CITED

The following references are of record in the file of this patent:

UNITED STATES PATENTS

| Number | Name | Date |
|---|---|---|
| 1,152,166 | Gallagher | Aug. 31, 1915 |
| 1,973,717 | Kessenich | Sept. 18, 1934 |
| 2,090,111 | Creveling | Aug. 17, 1937 |
| 2,133,021 | Ferguson | Oct. 11, 1938 |
| 2,228,999 | Birdseye | Jan. 14, 1941 |
| 2,385,140 | Knowles | Sept. 18, 1945 |
| 2,409,279 | Hiller | Oct. 15, 1946 |